UNITED STATES PATENT OFFICE.

CHARLES RICHARD VALENTINE, OF LONDON, ENGLAND.

CAPSULING FOOD EXTRACTS.

SPECIFICATION forming part of Letters Patent No. 628,681, dated July 11, 1899.

Application filed January 29, 1898. Serial No. 668,472. (No model.)

*To all whom it may concern:*

Be it known that I, CHARLES RICHARD VALENTINE, a subject of the Queen of Great Britain, residing at Lee, London, in the county of Kent, England, have invented new and useful Improvements in Capsuling Food Extracts, Medicines, and the Like, (for which I have applied for a patent in Great Britain, No. 16,805, dated July 15, 1897;) and I do hereby declare that the following is a full, clear, and exact description of the invention, which will enable others skilled in the art to which it appertains to make and use the same.

This invention relates chiefly to the capsuling of food extracts—such as extracts of meat, cream, and vegetable substances—but is also applicable to the capsuling of medicines and other substances.

It is well known that up till now no successful means have been found for capsuling food extracts such as those above named in consequence of the moisture in the extract or the humidity of the atmosphere injuriously affecting the gelatin from which the shell or capsule is made. Attempts have been made to overcome this defect, but without success. Now according to my invention I am enabled to capsule such extracts without the danger of the shells being affected by moisture, as above named, and to effect an economy in the manufacture of the capsules. For this purpose I take an ordinary gelatin capsule or shell and place it, either before or after it is filled with extract, in a solution which will render it insoluble under ordinary conditions, but readily soluble when placed in hot water or after being swallowed. I have found that a solution of alum gives good results and that capsules so treated become unaffected by moisture. In practice I find that a solution containing from two and one-half per cent. to five per cent. of alum is best for treating empty capsules or shells and from five per cent. to ten per cent. for treating filled capsules or shells.

It will be obvious that the great advantages derived from the use of capsuled food extracts are that the extracts can be put up in a portable form and in measured quantities, so as to be adapted for swallowing or for household use in making beef tea, soups, gravy-stock, and the like.

Another advantage derived from my invention is that for a given quantity of extract or the like to be capsuled I can employ a capsule normally of smaller size than hitherto, as the effect of treating the capsule by the alum solution is to cause it to become enlarged, the said capsule retaining its shape and enlarged size, or nearly so, on drying.

Having now particularly described and ascertained the nature of my said invention and in what manner the same is to be performed, I declare that what I claim is—

1. As a new article of manufacture, a gelatin capsule for foods unaffected by moisture at normal atmospheric temperatures, but soluble in the gastric juice or in water at or above the temperature of the human body.

2. As a new article of manufacture, a gelatin capsule unaffected by moisture at normal atmospheric temperatures, but soluble in the gastric juice or in water at or above the temperature of the human body, and containing a liquid food extract.

3. As a new article of manufacture, a gelatin capsule impregnated with alum, unaffected by moisture at normal atmospheric temperatures, but soluble in the gastric juice or in water at or above the temperature of the human body, and containing a liquid food extract.

CHARLES RICHARD VALENTINE.

Witnesses:
  G. F. REDFERN,
  JOHN E. BOUSFIELD.